Jan. 10, 1956 L. W. MITCHELL 2,729,854
AIRBAG
Filed Feb. 8, 1952

INVENTOR.
LEE W. MITCHELL
BY
Martin E. Anderson
ATTORNEY

United States Patent Office 2,729,854
Patented Jan. 10, 1956

2,729,854

AIRBAG

Lee W. Mitchell, Denver, Colo., assignor to The Gates Rubber Company, Denver, Colo., a corporation of Colorado Application February 8, 1952, Serial No. 270,661

1 Claim. (Cl. 18—45)

This invention relates to improvements in expansible bags employed during recapping of pneumatic tires.

In the recapping of pneumatic tires it is common practice to employ an endless circular expansible bag disposed within the tire casing which abuts a rigid rim at its inner peripheral portion and abuts the casing at its outer peripheral portion. Failures of the bag wall usually occur in the zones adjacent the rim edges, that is, in the zones between said inner and outer peripheral portions this being due to the thinning of the bag wall after considerable use. Attempts have been made to increase the bag life by thickening the bag wall at said zones but failures still occur thereat.

The principal object of this invention is to provide a bag which will minimize wall failures in the zones previously referred to;

A further object is to construct the bag with peripherally distortable wall means at said zones.

Still further objects, advantages and salient features will become more apparent from the description to follow, the appended claim, and the accompanying drawing in which:

Figure 2:
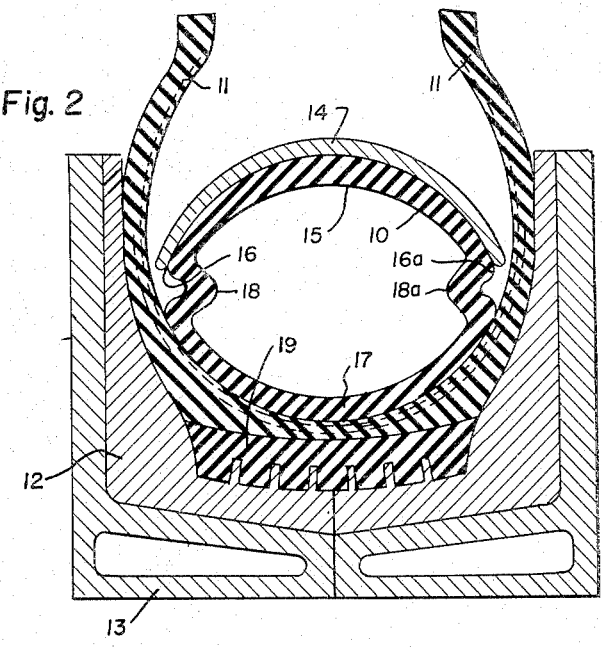
Figure 2 is an enlarged cross section taken on line 2—2, Figure 1, the bag being shown positioned in a casing disposed in a curing mold and with the bag collapsed.
Figure 1:
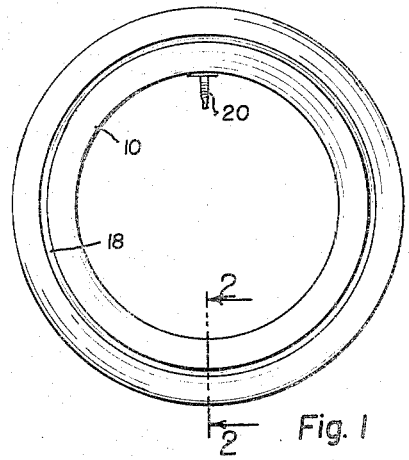
Figure 1 is a side elevation of the bag which forms the subject of the present invention.
Figure 2A:
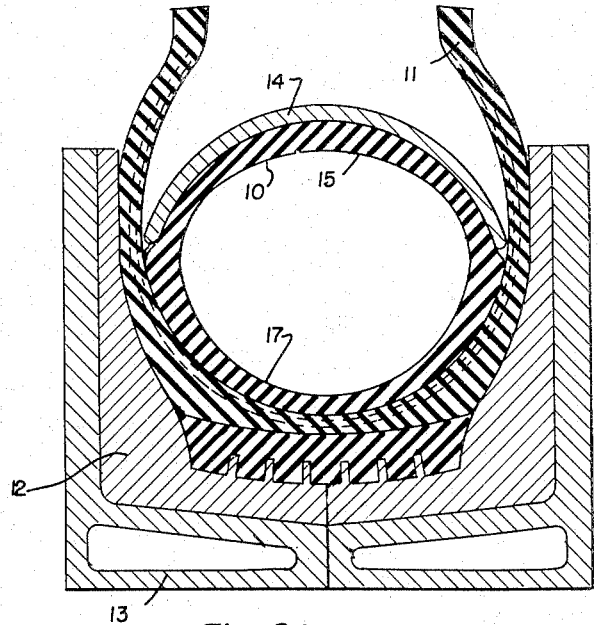
Figure 2A is like Figure 2 but with the bag expanded.

Referring in detail to the drawing, the bag 10 is a circular endless tube, generally toroidal shaped, but flattened somewhat as shown in Figures 2 and 2A. Referring to Figure 2, the bag is disposed within the casing 11, the latter being disposed within a full circle curing mold 12 disposed in a steam heated jacket 13. A conventional inside curing ring 14 is disposed within the casing and forms an abutment for the inner peripheral portion 15 of the bag, which portion extends between side edges 16, 16a of the ring. The remaining peripheral portion of the bag, which may be designated as the outer portion 17 thereof, is adapted to abut the inside wall of the tire casing. The bag failures previously mentioned usually occur within the areas adjacent 16, 16a of the rim.

As best shown in Figure 2, the inner and outer peripheral portions of the bag are joined by circumferentially extending, accordian-like folds 18, 18a. When the mold is heated and the bag expanded by internal pressure its outer portion forces casing 11, with camelback 19 thereon radially outwardly into the mold, as shown in Figure 2A.

In the prior art bags, previously referred to, the repeated expansion of the bag caused thinning of the walls, due to flow of the wall material, in the regions where the folds are provided by the present invention, which ultimately formed weakened zones and permitted rupture due to pressure within the bag or pinching thereof. The folds provided by this invention minimize such thinning and the attendant rupture. It has been determined that the major portion of the wall expansion occurs in the zones between the inner and outer portions of the bag, and in the prior art bags this would probably effect excessive stress concentrations thereat. It is apparent, however, that the folds permit considerable expansion of the bag wall as they flatten to the position shown in Figure 2A, without excessive stress concentrations being present. Furthermore, the wall portions adjacent the free edges of the rim are considerably thickened and strengthened when internal pressure is applied to the bag because, the material making up the fold is forced outwardly and compressed into the space between the outer circumferential portion of the bag and the rim.

Figure 3:
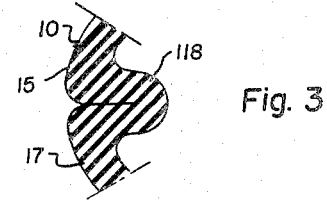
Figure 3 is a fragmentary cross section through an alternative form of bag wall.

Figure 3 illustrates an alternative form of fold 118 wherein the sides of the fold are in abutting relations when the bag is collapsed.

Figure 4:
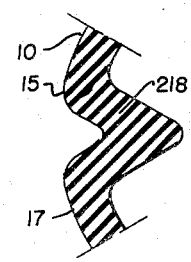
Figure 4 is a section, similar to Figure 3, of another alternative form of bag wall.

Figure 4 illustrates another alternative form of fold 218 wherein the fold is generally V-shaped when the bag is collapsed.

The bag may be of any rubber-like material, such as natural or synthetic rubber, Butyl rubber being especially suitable because of its characteristic to withstand high temperatures.

The bag is provided with suitable fluid conduit 20 to allow entrance to the bag of any fluid suitable for expanding same. While only a single accordian fold has been illustrated, it will be apparent that two or more similar joined folds may be employed.

Having described the invention, what is claimed as new is:

An annular, tubular bag of expansible material adapted to be confined in an annular chamber formed by part of the inner surface of a pneumatic tire and a conventional curing ring positioned therein during the curing operation, the bag being held in place by said curing ring, being preformed with inwardly extending endless folds placed on diametric opposite sides of the bag adjacent opposite edges of the curing ring, which folds unfold when the bag is subjected to internal fluid pressure, tending thereby to lengthen the periphery of the bag and produce a thickening of the wall surface due to said unfolding.

References Cited in the file of this patent

UNITED STATES PATENTS

| 1,368,631 | Huetter | Feb. 15, 1921 |
| 1,410,023 | McGuire | Mar. 21, 1922 |
| 1,705,083 | Burke | Mar. 12, 1929 |
| 2,582,715 | Murray | Jan. 15, 1952 |